April 28, 1953 — T. P. PAJAK — 2,636,539
METAL MOLDING BAG
Filed March 11, 1949 — 2 SHEETS—SHEET 1
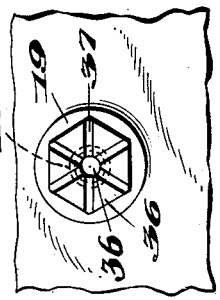
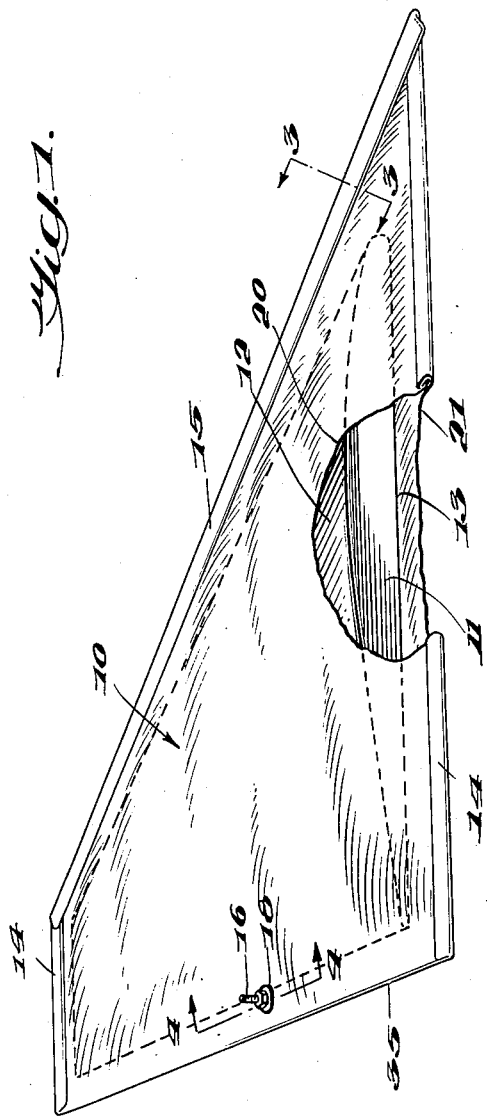
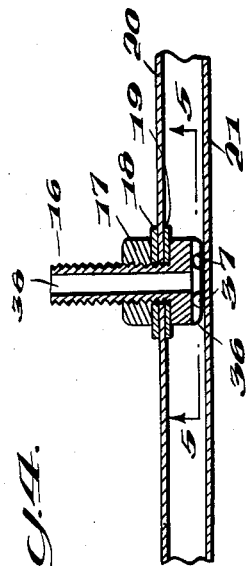
Inventor
THEODORE P. PAJAK,
By Martin E. Hogan Jr.
Attorney April 28, 1953 — T. P. PAJAK — 2,636,539
METAL MOLDING BAG
Filed March 11, 1949 — 2 SHEETS—SHEET 2

Inventor
THEODORE P. PAJAK,
By Martin E. Hogan Jr.
Attorney

Patented Apr. 28, 1953

2,636,539

UNITED STATES PATENT OFFICE 2,636,539

METAL MOLDING BAG

Theodore P. Pajak, Baltimore, Md., assignor to The Glenn L. Martin Company, Middle River, Md., a corporation of Maryland Application March 11, 1949, Serial No. 80,956

6 Claims. (Cl. 154—1)

This invention relates in general to molding devices and, more particularly, to an improved method and apparatus for hot molding structural material in a flexible metal enclosure placed under vacuum.

In the fabrication of complicated plastic parts into a composite structure, it has been customary to enclose and mold them as an assembly with an evacuated rubber bag formed as an enclosure for the assembly with the edges of the bag adhesively sealed to exclude admission of air. Removal of the assembly from the bag requires destruction of the bag if the edges cannot be readily separated. Such a procedure is not only slow and costly due to the high cost of materials and the labor involved, but also limits the field to the use of materials that are characterized by their poor heat conductivity. A further disadvantage in the use of rubber as an enclosure around an object to be molded under heat is that the maximum temperature which the rubber will withstand is relatively low.

These disadvantages have been overcome by the present invention which provides a method of forming a molding bag from a thin sheet of metal, such as aluminum foil, wherein the foil is folded over the object to be molded with the free edges of the sheet brought into alignment and sealed by being rolled and flattened to form an airtight bag from which the air is readily withdrawn for vacuum molding.

It is among the advantages of this invention to provide an improved method of forming a low cost metallic molding bag. The use of aluminum foil or a like metal sheet material allows for quick fabrication as such a material is highly ductile lending itself to the formation of seams that require no gluing or cementing.

Another object is to provide a method of molding which utilizes a flexible metal bag capable of forming to the shape of the object being molded without sticking thereto or to itself. A bag of this character permits the uniform molding under heat and pressure of assemblages comprised of a plurality of complicated parts having unusual contours as a single molding operation.

A further object is to provide a flexible molding bag capable of withstanding relatively high temperatures for use in a molding oven or autoclave.

A still further object is to provide a molding bag relatively high in heat conduction.

Still another object is to provide means for low cost molding wherein a flexible metal is used to form a molding bag capable of being reused.

Further objects, advantages, and novel features of this invention will be apparent from the following description in which reference is made to the accompanying drawings wherein like numbers refer to like parts.

Figure 1 is a perspective view of the foil molding bag of this invention positioned around an airfoil assembly to be molded.

Figure 4 is a sectional view of the air outlet stem taken on line 4—4 of Figure 1.

Figure 5 is a plan view of the stem base taken on line 5—5 of Figure 4.

Figure 2:
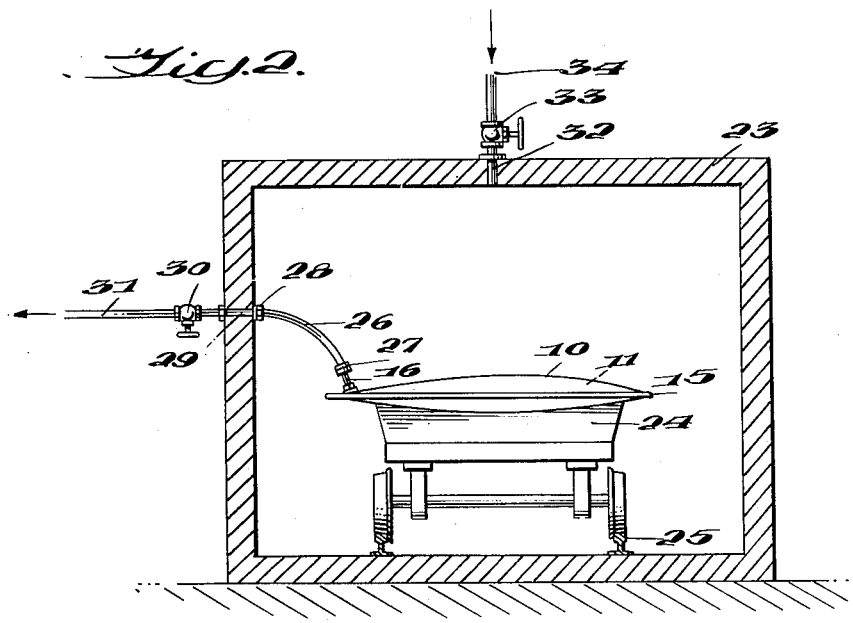
Figure 2 is a sectional view of a conventional autoclave with an object enclosed in the foil bag of this invention positioned therein for molding.

Referring more specifically to the drawings, Figure 1 illustrates the enclosure or bag 10 of this invention formed from a single sheet of aluminum foil or a like flexible metallic material. The object 11 shown within the bag in molding position consists of a conventional type of wing section used in the manufacture of aircraft in which metal surface sheets are adhesively bonded to a light weight tapered core section to provide a structure having a relatively thin trailing edge spaced from a thicker leading edge. It is to be noted that the top surface 12 of the wing section or object 11 is formed to a contour having a compound radius while the bottom area 13 is formed to a different contour. In the molding of such unusually shaped objects, it is highly desirable that the bag be so formed as to exceed the size of the assembly and allow for a close adherence thereto under a vacuum established within the bag as hereinafter more specifically described.

I have found it convenient and time saving to form the bag 10 from one sheet of metal foil folded over the object 11 to form a top portion 20 and a bottom portion 21. In this manner, I find it relatively easy to establish a straight fold line 35 where the sheet is folded over so as to place the edges of the sides 14 into alignment. After the location of the fold edge at line 35 is established, the vacuum stem 16, having an air passage 38, is inserted outwardly through the top 20 at approximately where the thin trailing edge of the object 11 will be placed. The location of the outlet stem adjacent to the edge of the object to be molded forms a natural tap into the air channel created along said edge lengthwise of the object for quick withdrawal of the air from the bag. The outlet stem 16 is formed with a threaded portion terminating in an enlarged base portion 36 positioned within the bag and is held in place by a nut 17 adapted for threaded engagement with the stem. In order to assure that an airtight fitting is made relative to the bag, a top washer 18 and a bottom washer 19 are placed around the stem 16 at each respective side of the top 20 for compressive engagement therewith. The air passage 38, as best shown in Figure 4, extends the full length of the stem 16 so as to open interiorly of the bag 10 with the stem in installed position. In order to guard against any tendency of the foil material of the bag to be sucked over the end of the stem 16 so as to close the air passage 38, the base 36 is formed with a plurality of radiating grooves 37 extending outwardly of the air passage to allow for free passage of the air thereinto.

Figure 3:
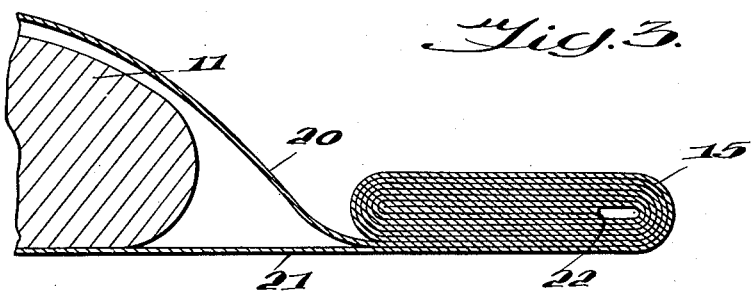
Figure 3 is a sectional view of the rolled edge of the bag taken on line 3—3 of Figure 1.

With the outlet stem 16 inserted and the object placed on the lower section 21 of the sheet, the opposite sides 14 of the bag are formed as an enclosure around the object by the rolling of the aligned edges of the top 20 and bottom 21 portions of the bag 10 as best illustrated in Figure 3. It is to be noted that these edges are turned back and rolled a sufficient number of times so as to form an airtight joint when flattened as shown. This not only forms a mechanical juncture, but also an airtight seal with no other sealing means being required. The edges at the front 15 are then rolled in the same manner so as to effect a complete airtight enclosure around the object except for the air outlet stem 16. It is to be noted that the metal foil is sufficiently stiff to retain the sealed condition of the edges without the necessity of using any form of adhesive or other sealing means. Furthermore, the juncture formed by the rolled edges is sufficiently strong to withstand all the necessary handling involved in a molding operation.

The bag 10 in its sealed condition enclosing object 11 is then ready for insertion as a unit into the molding oven or autoclave 23 (Figure 2). Any suitable means of supporting the unit may be used such as the wheel car 24 carried by rails 25. The bag 10 is next vacuumized to collapse it around the object 11 in order to impose molding pressure thereon by withdrawal of the air contained therein through an air duct 26 connected to the air outlet stem 16 by a coupling 27. The air duct 26 is, in turn, coupled to a wall nipple 29 by a pipe coupling 28 so as to provide for communication with a vacuum line 31 equipped with a shut-off valve 30 positioned outside the autoclave 23 for operational purposes. Heating of the autoclave 23 is accomplished by means of a steam duct 34 that opens into the interior of the autoclave as at inlet 32 extended through the autoclave wall. Control of the amount of steam admitted into the autoclave is provided by a control valve 33 placed outside the autoclave. Although an autoclave is described, it will be understood by those skilled in the art that most any conventional type of oven having suitable heat control means will give satisfactory results.

The high heat conductivity characteristic of the metal foil from which the bag 10 is formed allows for rapid transfer of heat to the material being molded, making it possible to obtain the same degree of molding efficiency attainable with other means of direct metal contact, such as in a heated press mold. The heat range of the metal foil used to form the bag 10 is sufficient to allow for molding within the heat ranges conventional to this type of work.

The method of operation is to assemble the object 11 to be molded with the parts to be joined, covered by a coating of adhesive after which the assemblage is placed on a sheet 21 of the metal foil sufficiently large in area to allow for doubling back over the object. Obviously, two separate sheets could be used with all four sides joined and sealed by rolling and crushing as previously described; however, if one sheet is used, a more efficient aligning of the edges is provided than can be attained by the use of two separate sheets. Before the top portion 20 of the bag 10 is finally positioned, the outlet stem 16 is inserted outwardly thereof by piercing the top section of foil adjacent the fold line 35. The outlet stem 16 is then secured in position by a suitable washer and nut assembly as illustrated by Figure 4. The enclosed object 11 is placed in the autoclave 23 with the air outlet positioned for connection to the vacuum duct 26 by the coupling 27. The autoclave is closed and the air removed from the bag 10 by means of the vacuum line 31 placing the object being molded under vacuum with the flexible bag material drawn in tightly around the object to effect pressurized molding of the metal surface sheets 12 and 13 together and to the core to form a unitary molded structure. Sufficient heat is introduced into the oven by means of the steam line 34 through control valve 33 and outlet 32 opening into the autoclave to completely cure the bonding adhesive used. The heat is maintained for the required period of time according to conventional molding practices after which the autoclave 23 is cooled and the assemblage removed.

The edges 14 and 15 of the foil bag 10 are easily unrolled making the bag material available for repeated use as it is unaffected by the heat to which it is subjected in the autoclave.

Although my invention has been described in connection with the molding of an airfoil, it will be appreciated that it is well suited to the working of articles of general utility and particularly those involving unusual shapes or contours and that numerous variations in material and procedure may be made without departing from the scope of the invention as defined in the claims.

I claim as my invention:

1. A heat resistant flexible bag for molding an object under heat and vacuum comprising a metal enclosure formed of flexible metal foil, said enclosure being formed with top and bottom portions having edges roll-joined together capable of separation by being unrolled, air outlet means carried by said enclosure having an air duct adapted for connection to a vacuum line to withdraw air from the enclosure, said air duct being provided with a base portion positioned within the enclosure and radially channeled for passage of air from within said enclosure normal to the centerline of the duct.

2. A flexible molding bag of high heat conductivity formed from a single sheet of metal foil, said sheet being folded over upon itself to provide upper and lower sheet sections connected together at a fold line defining one edge of said bag, said sheet sections contacting one another along their remaining edges and being jointly folded over along each of said last mentioned edges to form a plurality of superimposed layers in intimate contact with one another to provide self-sustaining but readily separable, air-tight seams along said edges, and means providing an air duct communicating with the interior of said bag and adapted for connection to a vacuum source to remove air from said interior.

3. A flexible molding bag of high heat conductivity comprising upper and lower sheet sections of metal foil, said sheet sections contacting one another along their periphery to form an air-tight enclosure, the edges of said sections, along at least the major portion of said periphery, being jointly folded over in reentrant fashion to form a plurality of superimposed layers in intimate contact with one another to provide a self-sustaining but readily separable, air-tight seam along said portion, and means providing an air duct communicating with the interior of said bag and adapted for connection to a vacuum source to remove air from said interior.

4. A flexible molding bag of high heat conductivity comprising upper and lower sheet sections of metal foil, said sheet sections contacting one another along their periphery to form an air-tight enclosure, the edges of said sections, along at least the major portion of said periphery, being jointly folded over in reentrant fashion to form a plurality of superimposed layers in intimate contact with one another to provide a self-sustaining but readily separable, air-tight seam along said portion, and means providing an air duct communicating with the interior of said bag and adapted for connection to a vacuum source to remove air from said interior, said means being located adjacent the periphery of said bag.

5. The method of molding and bonding a composite structure under relatively high temperature conditions, comprising wrapping said structure with flexible metal foil having high heat conductivity, folding together the edges of said foil to form an air-tight, heat conducting bag around said structure, evacuating said bag, and applying heat to the exterior of said bag while thus evacuated.

6. The method of molding and bonding a composite structure under relatively high temperature conditions, comprising placing said structure upon a sheet of flexible metal foil, folding said foil over the material to bring the edge portions thereof into intimate contact, jointly folding said edge portions to provide an air-tight bag about said material, evacuating said bag and subjecting the assembly to relatively high temperatures while thus evacuated.

THEODORE P. PAJAK.

References Cited in the file of this patent

UNITED STATES PATENTS

| Number | Name | Date |
|---|---|---|
| 1,931,324 | Newton | Oct. 17, 1933 |
| 1,989,032 | Westin | Jan. 22, 1935 |
| 2,202,042 | Blount | May 28, 1940 |
| 2,276,004 | Vidal et al. | Mar. 10, 1942 |
| 2,283,946 | Pitman | May 26, 1942 |
| 2,392,108 | Vidal et al. | Jan. 1, 1946 |
| 2,395,468 | Eames | Feb. 26, 1946 |
| 2,517,698 | Muskat | Aug. 8, 1950 |

FOREIGN PATENTS

| Number | Country | Date |
|---|---|---|
| 310,995 | Great Britain | May 6, 1929 |
| 488,315 | Great Britain | July 5, 1938 |